United States Patent Office 3,224,217
Patented Dec. 21, 1965

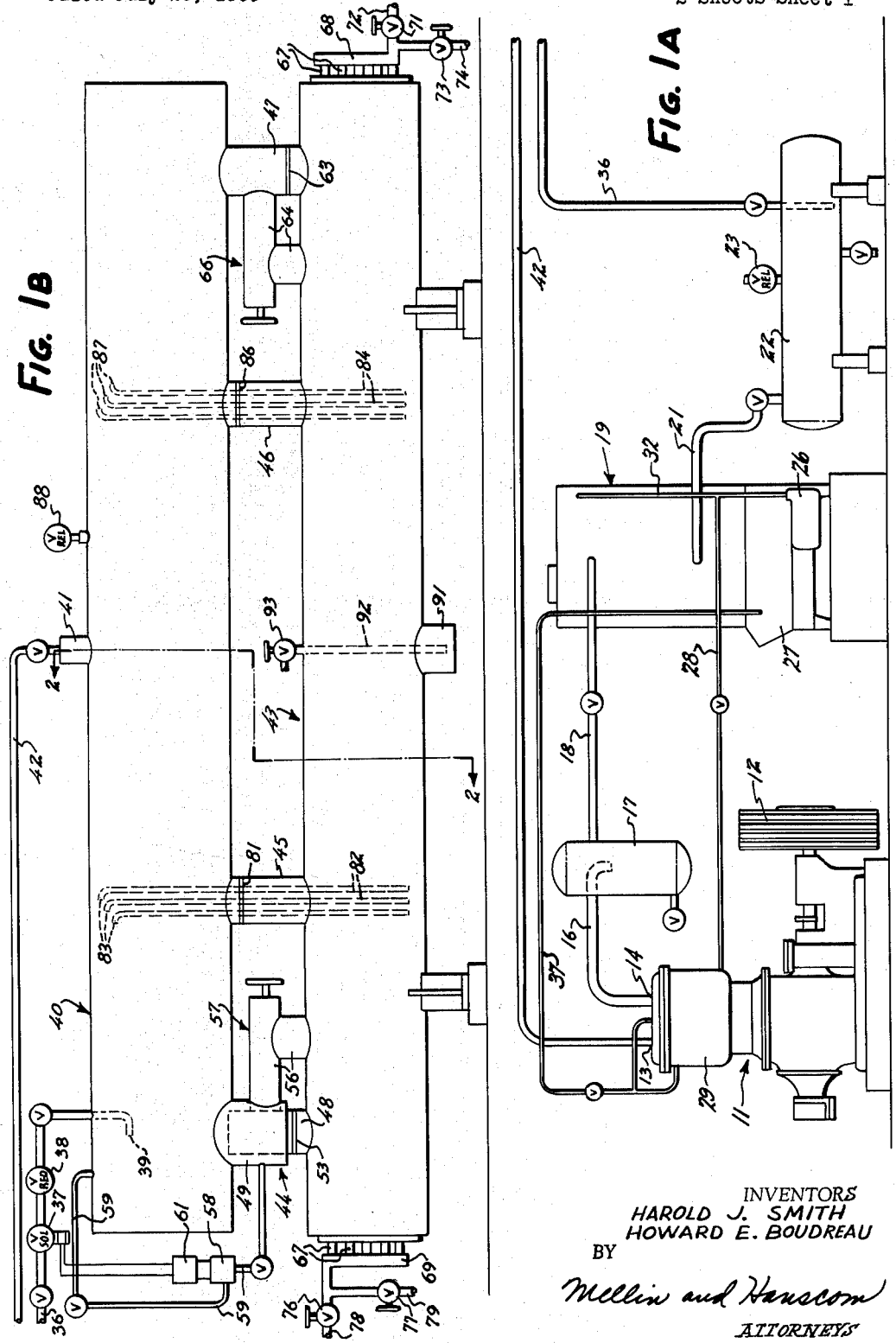

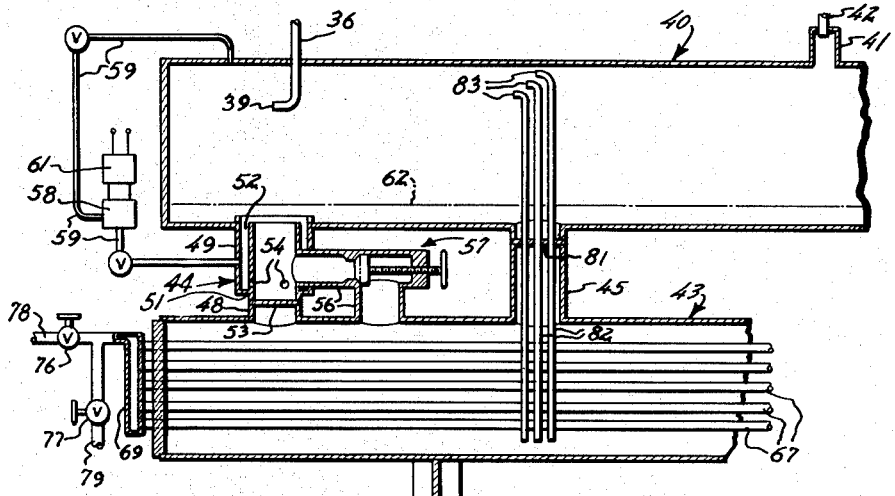
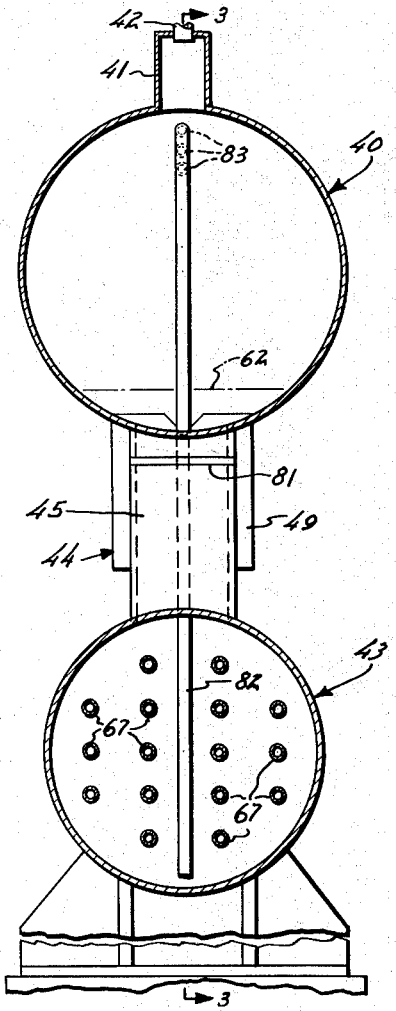
Fig. 3
Fig. 2
INVENTORS
HAROLD J. SMITH
HOWARD E. BOUDREAU
BY
Mellin and Hanscom
ATTORNEYS

3,224,217
REFRIGERATING SYSTEM INCLUDING AN ACCUMULATOR
Harold J. Smith, San Francisco, and Howard E. Boudreau, Daly City, Calif., assignors to Cyclops, Inc., San Francisco, Calif., a corporation of California
Filed July 25, 1963, Ser. No. 297,541
5 Claims. (Cl. 62—221)

This invention relates to refrigerating apparatus, and more specifically to apparatus used for cooling wine in the production thereof.

After the initial fermentation of wine is completed, the wine is cooled to control the fermentation temperature during the fermentation process and to shorten the storage time necessary to precipitate the tartrates from the wine. Conventionally this cooling is carried out by passing the wine through stainless steel heat exchange tubes that are disposed in a tank filled with liquid ammonia. The temperature of the wine causes the ammonia to evaporate, thus drawing heat from the wine. The evaporated ammonia is withdrawn, compressed by a compressor and liquefied by a condenser for reintroduction into the cooling tank. During this process tartar deposits are formed on the interior walls of the heat exchange tubes, requiring frequent cleaning of the tubes. Each time that cleaning operations are carried out, the wine production operations are necessarily shut down, and it is accordingly important to carry out the cleaning in as short a time as possible in order to maintain efficient operations.

Cleaning can be carried out by shutting down the compressor and by passing a cleaning solution through the tubes to dissolve the tartar deposits. If the liquid ammonia is left in the cooling tank the cleaning solution must be relatively cold so that the pressure of the ammonia in the cooling tank evaporated by the heat of the cleaning solution is less than the pressure for which the safety valve on the tank is set, otherwise ammonia will be lost through the safety valve. However, if cold cleaning solutions are used, the rate of dissolution of the tratar deposits will be quite slow and several hours will be required to clean the tubes sufficiently for further use.

Cleaning of the tubes can be carried out much more rapidly if a high temperature cleaning solution is used. However, in order to used a hot cleaning solution, the cooling tank must be evacuated of liquid ammonia in order to avoid excessive pressures within the cooling tank. Heretofore a separate storage tank has been used to receive the liquid ammonia from the cooling tank during the cleaning process, with the ammonia being pumped to and from the storage tank through additional piping. The use of an extra storage tank, piping and pump increases the cost of the equipment and still requires an appreciable amount of time to transfer the liquid ammonia charge from the cooling tank to the storage tank through the connecting piping at the start of cleaning and to transfer the ammonia back to the cooling tank at the end of the cleaning process.

It is the primary object of this invention to provide a refrigerating apparatus in which cleaning operations can be carried out with a minimum amount of down time.

A further object of the invention is to provide a refrigerating apparatus whereby an ammonia accumulator tank is disposed immediately above the cooling tank and is of sufficient capacity to contain all of the ammonia in the cooling tank, and wherein the ammonia in the cooling tank may be rapidly and automatically transferred from the cooling tank to the accumulator tank for storage during a cleaning process.

Yet another object is to provide a refrigerating apparatus wherein the internal pressure of the cooling tank during cleaning by a hot solution does not increase substantially, thereby increasing the safety of the apparatus.

A still further object of the invention is to provide a refrigerating apparatus having a minimum of parts and valves required to be operated by the workmen to carry out a cleaning operation.

Other objects and advantages will become apparent in the course of the following detailed description.

In the drawings, forming a part of this application and in which like parts are designated by like reference numerals throughout the same, FIGS. 1A and 1B are continued elevational views of a complete refrigerating system constructed and arranged in accordance with the invention.

FIG. 2 is a sectional view of the cooling and accumulator tanks of the refrigerating apparatus, taken on line 2—2 of FIG. 1.

FIG. 3 is a sectional view of the portions of the cooling and accumulator tanks shown in FIG. 2, taken on line 3—3 of FIG. 2.

Referring now to the drawings, wherein is illustrated a preferred embodiment of the invention, FIGS. 1A and 1B show a refrigerating system comprising a compressor 11, driven by belts 12 from a motor (not shown), having an inlet 13 and an outlet 14, which functions to compress an evaporated refrigerant, preferably ammonia, and to deliver the compressed refrigerant through conduit 16, oil separator 17 and conduit 18 to the evaporating condenser 19. The condensed refrigerant is forwarded through conduit 21 to the receiving tank 22, which is provided with a usual pressure relief valve 23.

A water pump 26 takes water from pan 27 located at the bottom of the condenser 19 and circulates the water through conduit 28 to the cooling jacket 29 of the compressor 11, the water then being returned to pan 27 by conduit 31. The pump 26 also circulates water through conduit 32 to the spray nozzle (not shown) in the condenser 19 so that water is sprayed over the condensing coils in the condenser to condense the ammonia therein, the water then dripping down into the pan 27.

The liquid refrigerant passes from the receiver 22 through conduit 36, solenoid valve 37, pressure reducing expansion valve 38 into the top of the closed cylindrical accumulator tank 40. The end 39 of conduit 36 is directed towards one end of the tank 40. The accumulator tank has a dome 41 generally centrally thereof which is connected by conduit 42 to the inlet 13 of the compressor 11.

The accumulator tank 40 is supported on and above the closed cylindrical cooling tank 43 by tubular columns 44, 45, 46 and 47. As best seen in FIG. 3, tubular column 44 comprises concentrically disposed tubular members 48 and 49 joined together at 51 to provide an annular space 52 therebetween. Plate 53 closes off tubular member 48 to allow flow therethrough. Tube 48 is apertured at 54 to allow oil trapped in space 52 to drain into tube 48. A conduit 56 extends from tubular member 48 to the top of cooling tank 43, and a manually operable valve 57 in conduit 56 enables the conduit to be opened and closed to fluid flow therethrough.

A conventional liquid level-responsive device 58 is disposed in conduit 59, which connects space 52 to the top of the accumulator tank, and actuates the switch 61 in response to the level of liquid refrigerant in conduit 59 to control the solenoid valve 37 in order to maintain the level of liquid refrigerant in the accumulator tank at a predetermined level 62.

Tubular column 47 is closed off interiorly thereof by plate 63, but conduit 64 allows fluid to flow between the bottom of the accumulator tank and the top of the cooling tank. Manually operable valve 66 in conduit 64 controls flow therethrough.

A plurality of stainless steel heat exchange tubes 67 extend longitudinally through the cooling tank and are connected together at their ends by inlet headers 68 and outlet headers 69. The inlet headers 68 are connected by manually operable valve 71 to conduit 72, which is supplied with wine to be cooled from a storage tank (not shown), and are connected by manually operable valve 73 to conduit 74, which is connected to a source (not shown) of cleaning solution. The outlet headers 69 may be connected alternately by manually operable valves 76 and 77 to conduits 78 and 79 which lead to a wine receiving tank and a drain (neither shown) respectively.

Tubular column 45, supporting the accumulator tank 40 on the cooling tank 43, is closed off interiorly thereof by plate 81. A plurality of tubes 82 extend from the interior of the cooling tank 43 from below the lowermost heat exchange tube 67 up through column 45 and plate 81 into the accumulator tank 40. The upper ends 83 of tubes 82 are directed towards the end of the accumulator tank and away from the outlet dome 41 of the accumulator tank. Similarly, tubes 84 extend from the interior of the cooling tank 43 from below the lowermost heat exchange tubes 67 up through column 46 and plate 86 therein into the accumulator tank, with the upper ends 87 of tubes 84 being directed away from the accumulator tank dome 41. Tubes 82 and 84 are unvalved and maintain fluid communication between the cooling and accumulator tanks at all times.

The accumulator tank is equipped with a standard pressure relief valve 88 at the top thereof.

The accumulator tank 40 is of larger diameter than the cooling tank 43 so that the volume of the accumulator tank between the horizontal planes defined by level 62 and the top ends of tubes 82 and 84 is at least as great as the volume of the cooling tank above the lowermost heat exchange tubes 67 that is normally filled with refrigerant.

The cooling tank 43 is provided with an oil collecting sump 91. Pipe 92 extends from the sump through manually operable valve 93, to allow for the removal of oil that accumulates in the sump.

In the operation of the system, the compressor 11, which runs continuously, compresses the evaporated ammonia entering the inlet 13 thereof and forces the compressed evaporated ammonia to the condenser 19 wherein the evaporated ammonia is liquefied. The liquid ammonia is stored in receiver 22 and is forced by the pressure of the compressor through conduit 36 to the accumulator tank 40. In a typical installation, the pressure at the inlet of the compressor will be in the order of 30 p.s.i.g. and the pressure in the receiver will be in the order of 150 p.s.i.g. The expansion valve 38 reduces the pressure of the liquid ammonia to about 30 p.s.i.g.

In normal cooling operation, the manually operable valves 57 and 66 are fully open to allow liquid ammonia to flow freely from the accumulator tank to the cooling tank, so that the cooling tank is filled completely with liquid ammonia. The float switch 61 controls the solenoid valve 37 to maintain the liquid level of the ammonia at level 62 in the accumulator tank.

As wine passes through conduit 72, valve 71, inlet headers 68 and heat exchange tubes 67, the temperature of the wine will cause the liquid ammonia to evaporate, drawing heat from the wine so that the wine passing out through headers 69, valve 76 and conduit 73 is cooled. The evaporated ammonia bubbles upwardly through conduits 56 and 64 into the accumulator tank and is removed from dome 41 by conduit 42 for recompression by the compressor 11. As liquid ammonia is evaporated, the liquid level in the accumulator tank 40 drops, causing the level-responsive switch 61 to open the solenoid valve to allow more liquid ammonia to flow into the accumulator tank to maintain the liquid level at 62.

As the wine is cooled in the heat exchange tubes 67, tartar deposits form in the tubes, and necessitate relatively frequent cleanings of the tubes. To clean the tubes, manually operable valves 57 and 66 are closed to prevent fluid flow between the bottom of the accumulator tank and the top of the cooling tank. Manually operable valves 71 and 76 are closed to isolate the heat exchange tubes from the wine handling conduits 72 and 78. Manually operable valves 73 and 77 are opened to allow a hot cleaning solution to be passed through.

As the hot cleaning solution passes through the tubes 67, the liquid ammonia in contact with the tubes will be evaporated and will bubble to the top of the cooling tank 43. Since valves 57 and 66 are closed, the evaporated ammonia collects there and the pressure thereof will force the liquid ammonia down in the cooling tank and up through tubes 82 and 84 into the accumulator tank 40.

In a relatively short time all of the liquid ammonia in the cooling tank in contact with the heat exchange tubes 67 is forced into the accumulator tank, where it is stored in the space in the accumulator tank between the normal liquid level 62 and the upper ends of the tubes 82 and 84.

Cleaning is continued for as long as necessary. No dangerous pressures are built up in the cooling and accumulating tanks, because the heat exchange tubes 67 are not in contact with liquid ammonia but are only in contact with evaporated ammonia, which has a low heat capacity. Furthermore, the interior of the cooling tank is always in fluid communication by open tubes 82 and 84 with the interior of the accumulator tank so that the pressure in the cooling tank is always substantially the same as in the accumulator tank and the accumulator tank safety valve 88 thus affords protection to both the accumulator and cooling tanks.

When cleaning is complete, the valves 73 and 77 are closed. Valves 57 and 66 are opened to allow the liquid ammonia to drain from the accumulator tank back into the cooling tank to refill the cooling tank. Valves 71 and 76 are then opened to allow wine to again pass through the heat exchange tubes.

As may be seen, a minimum amount of down time is required to empty the cooling tank 43 of the liquid ammonia for tube cleaning and to refill the cooling tank for normal operation because the liquid ammonia is merely transferred back and forth between the cooling tank and the accumulator tank. No separate storage tank and connecting lines therefor are required, and a minimum amount of evaporated ammonia is handled by the compressor 11. Depending upon the temperature of the cleaning solution, it will take from five to ten minutes to transfer the liquid ammonia from cooling tank containing a 1200-pound charge of ammonia to the accumulator tank and another five or ten minutes to complete cleaning operations.

As the liquid ammonia enters the accumulator tank through tubes 36, 82 and 84, the pressure thereof will cause the liquid ammonia to be sprayed into the tank, which will entrain some of the liquid ammonia in the evaporated ammonia in the top of the accumulator tank. In order to reduce to a minimum the amount of liquid ammonia delivered by conduit 36 to the compressor 11, the tube ends 39, 83 and 87 are all directed away from the dome 41 so that as much as possible of the liquid ammonia will settle into the liquid ammonia in the bottom of the accumulator tank.

Conduit 59, which connects to the level-responsive member 58, is connected to space 52 at a level substantially below the level 62 so that surges in the liquid ammonia in the accumulator tank will not directly affect the level-responsive member 58, thereby enabling better control of the level of the liquid ammonia in the accumulator tank. It will also be noted that the evaporated ammonia bubbles up through tubular member 48 and does not enter space 52, which remains filled solely with liquid ammonia.

Apertures 54 enable any oil form compressor 11 to flow from annular space 52 into tubular member 48 and from there into the cooling tank. As oil collects in sump 91 of the cooling tank, it may be removed by opening valve 93. The pressure in the cooling tank will then force the accumulated oil out through conduit 92.

Although the drawings do not illustrate any insulation of the system, it should be realized that this is merely for purposes of clarification in the drawings, and that it is intended that all of the low-pressure portions of the system be insulated, as is conventional in refrigeration systems. That is, the cooling tank 43, the accumulator tank 40, the connections therebetween, and conduits 59 and 42 are to be insulated.

It is to be further noted that the drawings indicate that conduits 18, 21, 32, 33, 36 and 59 are all provided with unnumbered valves therein. These valves are utilized for maintenance operations and are all normally open during the cooling and cleaning operations described above.

It is to be understood that the apparatus illustrated in the drawings and described above is to be considered as a preferred embodiment of the invention, and that various changes may be made in the shape, size and arrangement of parts without departing from the spirit of the invention or the scope of the attached claims.

Having thus described our invention, what we claim is:

1. A refrigerating device comprising:
   a cooling tank;
   tubular heat exchange means disposed in said cooling tank above the bottom of said cooling tank;
   an accumulator tank disposed above said cooling tank in close adjacency thereto;
   first conduit means connecting the bottom of said accumulator tank to the top of said cooling tank;
   manually operable valve means in said first conduit means;
   an inlet connection to said accumulator tank;
   control means for controlling flow of liquid refrigerant through said inlet connection to maintain the liquid refrigerant in said accumulator tank at a predetermined level;
   an outlet connection to the top of said accumulator tank;
   second conduit means extending from the interior of said cooling tank below said heat exchange means to the interior of said accumulator tank adjacent the top thereof;
   the volume of said accumulator tank between said predetermined level and the level of the top of said second conduit means being at least as great as the volume of said cooling tank above the lowermost portion of said heat exchange means therein.

2. A refrigerating device comprising:
   a cooling tank;
   tubular heat exchange means disposed in said cooling tank above the bottom of said cooling tank;
   an accumulator tank disposed above said cooling tank;
   first conduit means extending from the bottom of said accumulator tank to the top of said cooling tank for passage of liquid refrigerant downwardly from said accumulator tank to said cooling tank and for passage of evaporated refrigerant upwardly from said cooling tank to said accumulator tank;
   valve means for opening and closing said first conduit means to passage of fluid therethrough;
   an inlet connection to said accumulator tank for passage of liquid coolant into said accumulator tank;
   control means for controlling flow of liquid refrigerant through said inlet connection to maintain the liquid refrigerant in said accumulator tank at a predetermined level;
   an outlet connection to the top of said accumulator tank for removing evaporated refrigerant gas from said accumulator tank;
   second conduit means extending from the interior of said cooling tank below said heat exchange means to the interior of said accumulator tank adjacent the top thereof;
   the volume of said accumulator tank between said predetermined level and the level of the top of said second conduit means being at least as great as the volume of said cooling tank above the lowermost portion of said heat exchange means therein.

3. A refrigerating system comprising:
   a compressor having an inlet and an outlet;
   a condenser having an inlet connected to said compressor outlet;
   a cooling tank;
   a tubular heat exchange means disposed in and above the bottom of said cooling tank;
   an accumulator tank disposed above said cooling tank in close adjacency thereto;
   means including a first conduit for connecting the outlet of said condenser to the interior of sadi accumulator tank;
   first valve means in said first conduit;
   level-responsive means for operating said first valve to maintain at least a predetermined level of liquid refrigerant in said accumulator tank;
   second conduit means connecting the bottom of said accumulator tank and the top of said cooling tank for flow of liquid refrigerant downwardly from said accumulator tank to said cooling tank and for flow of evaporated refrigerant upwardly from said cooling tank to said accumulator tank;
   second valve means in said second conduit means for opening and closing said second conduit means to passage of fluid therethrough;
   third conduit means connecting the top of said accumulator tank and said compressor inlet;
   fourth conduit means extending from the interior of said cooling tank below said heat exchange means to the interior of said accumulator tank above said predetermined level of liquid refrigerant therein;
   the volume of said accumulator tank between said predetermined level and the level of the top of said fourth conduit means being at least as great as the volume of said cooling tank occupied by refrigerant above the lowermost portion of said heat exchange means therein.

4. A refrigerating device comprising:
   a cooling tank;
   a tubular heat exchange means disposed in said cooling tank above the bottom thereof;
   an accumulator tank disposed above said cooling tank;
   first conduit means for passage of liquid refrigerant from the bottom of said accumulator tank into said cooling tank and for passage of evaporated refrigerant from the top of said cooling tank into said accumulator tank;
   valve means for opening and closing said first conduit means to the passage of liquid and evaporated refrigerant therethrough;
   an inlet connection to said accumulator tank for enabling said accumulator tank to be filled with liquid refrigerant to a predetermined level therein;
   an outlet connection in the upper end of said accumulator tank for the removal of evaporated refrigerant therefrom;
   a second conduit extending from the interior of said cooling tank below said heat exchange means and terminating at its upper end interiorly of said accumulator below said output connection;
   the volume of said accumulator tank between said predetermined level and the level of the top of said second conduit means being at least as great as the volume of said cooling tank above the lowermost portion of said heat exchange means therein.

5. A refrigerating system comprising:
   a compressor having an inlet and an outlet;
   a condenser having an inlet connected to said compressor;
   a cooling tank;

a tubular heat exchange means disposed in and above the bottom of said cooling tank;

an accumulator tank disposed above said cooling tank;

first conduit means for passage of liquid refrigerant from the bottom of said accumulator tank to said cooling tank and for passage of evaporated refrigerant from the top of said cooling tank to said accumulator tank;

valve means for opening and closing said first conduit means to the passage of liquid refrigerant into and evaporated refrigerant from said cooling tank;

means fluidly connecting the outlet of said condenser to one of said tanks for enabling said accumulator tank to be filled with liquid refrigerant to a predetermined level therein;

second conduit means extending from the interior of said cooling tank below said heat exchange means to the interior of said accumulator tank below the top of said accumulator tank;

means fluidly connecting the top of said accumulator tank and said compressor inlet;

the volume of said accumulator tank between said predetermined level and the level of the top of said second conduit means being at least as much as the volume of said cooling tank above the lowermost portion of said heat exchange means therein.

References Cited by the Examiner
UNITED STATES PATENTS

| | | | |
|---|---|---|---|
| 1,735,724 | 11/1929 | Bergdoll | 62—149 |
| 1,866,991 | 7/1932 | Zieber | 62—512 |
| 1,898,277 | 2/1933 | Von Seggern | 62—303 |

MEYER PERLIN, *Primary Examiner.*

ROBERT A. O'LEARY, *Examiner.*